No. 814,402. PATENTED MAR. 6, 1906.
C. E. SIMPSON.
VALVE.
APPLICATION FILED MAY 25, 1904.
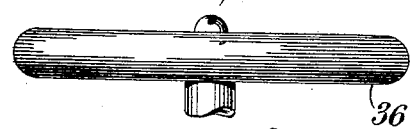
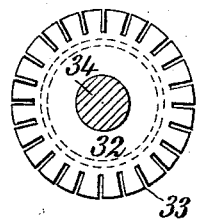
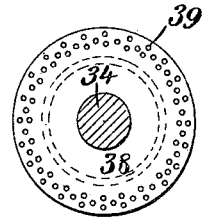
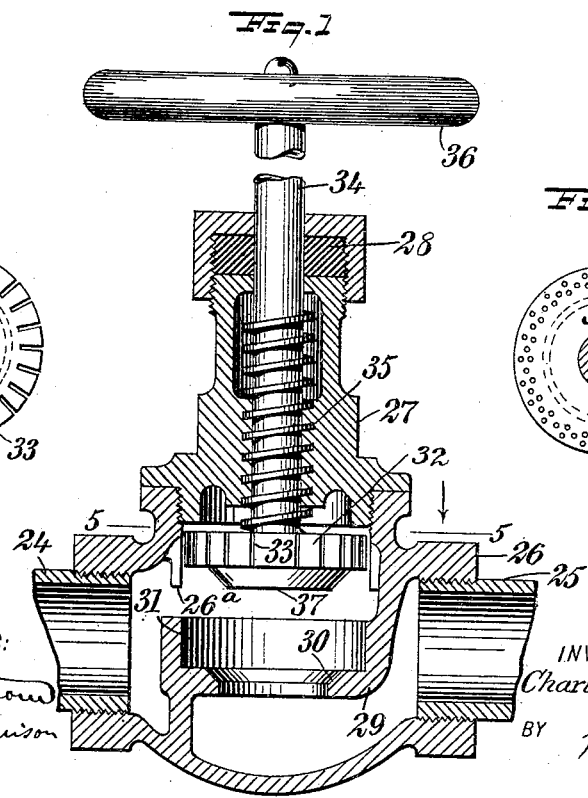
WITNESSES:
John Bergstrom
Walton Harrison
INVENTOR
Charles E. Simpson
BY
ATTORNEYS

UNITED STATES PATENT OFFICE.

CHARLES E. SIMPSON, OF PORTSMOUTH, OHIO.

VALVE.

No. 814,402.  Specification of Letters Patent.  Patented March 6, 1906.

Application filed May 25, 1904. Serial No. 209,711.

*To all whom it may concern:*

Be it known that I, CHARLES E. SIMPSON, a citizen of the United States, and a resident of Portsmouth, in the county of Scioto and State of Ohio, have invented a new Improvement in Valves, of which the following is a full, clear, and exact description.

My invention relates to valves of the various kinds used in connection with pipes for conveying water, steam, gas, &c., my more particular object being to produce a valve that will prevent scale or foreign substances from being caught on the valve-seat as the valve is being closed, thereby preventing the injury often done by scale being crushed on or embedded in the valve-seat or preventing the valve from entirely closing because of the obstruction having caught between the closing parts.

My invention is not intended to prevent the free flow of fluid and scale while the valve is open or being opened, but only comes in use while the valve is being closed, and the idea is to have one part of the valve close sufficiently tight to prevent passage of scale, while yet allowing enough of strained fluid to wash away any scale that may be in a position to prevent the proper seating of the later closing or sealing part, and I accomplish this in the following-described manner.

Reference is to be had to the accompanying drawings, forming a part of this specification, in which similar characters of reference indicate corresponding parts in all the figures.

Figure 1 is a vertical section through a globe-valve equipped with my invention. Fig. 2 is a section upon the line 5 5 of Fig. 1 looking in the direction of the arrow, the casing being removed; and Fig. 3 is a similar section showing a modified form of a valve member.

As to the structure shown in Fig. 1, the stem 34, with threads 35 and part 37, with seat 30, and all the outside casing is an ordinary globe-valve in common use, my improvement being shown in disk 32 of Fig. 2, with slots 33 in the outer edge and the valve-seat extension 31. The service-pipes are shown at 24 25, the casing at 26, the stem-casing at 27, the packing at 28, the web or partition at 29, and the valve-seat at 30, this valve-seat being provided with a cylindrical portion 31. A disk 32 is provided with slots 33 adjacent to its edge, being thus fashioned into a strainer, and is provided with a tapered portion 37, adapted to enter the valve-seat 30. The disk is raised or lowered by means of a stem 34, rigidly connected therewith, this stem being provided with a thread 35 and a hand-wheel 36 and being revolubly mounted within the column 27. Lugs 26$^a$ guide the disk 32 relatively to the cylindrical portion 31 of the web. When the disk is lowered within the cylindrical portion 31, the edge of the disk serves as a strainer, and thus allows the fluid to pass through the valve, clearing out all sediment or scales. This is done with the valve only partially closed, and when the disk is lowered in act of closing there can be no scales or sediment which would interfere with the perfect seating of the valve.

In Fig. 3 is shown a modified form of the disk 32, showing perforations 39 instead of the slots 33. My object in making the slots 33 or perforations 39 is to allow a flow of strained fluid to pass while the valve is being closed. In closing this valve the disk 32 enters the seat extension 31 and stops the passage of scale, allowing the fluid in a strained condition to pass through the perforations while the valve is being closed until the part 37 comes in contact with the seat 30. The object I have in providing for a flow of strained fluid while the valve is being closed is to wash out any foreign substance that may have passed just before the disk 32 enters the top of the extension 31, as without this flow scale or obstructions may remain on the valve-seat 30, and thereby prevent the proper closing of the valve.

Having thus described my invention, I claim as new and desire to secure by Letters Patent—

In a valve, the combination of a casing provided with a web having a valve-seat, said casing being further provided with an annular portion integral with said web, a movable valve member encircled by said annular portion and adapted to engage said valve-seat, said movable valve member being provided with a strainer portion adapted to fit tightly against said web when said valve member engages said seat, said strainer portion being free to strain a liquid when the valve is closing and being out of use when the valve is either open or closed completely.

In testimony whereof I have signed my name to this specification in the presence of two subscribing witnesses.

CHARLES E. SIMPSON.

Witnesses:
EDGAR F. DRAPER,
H. L. CLINE.